(12) United States Patent
Noborio et al.

(10) Patent No.: US 9,903,096 B2
(45) Date of Patent: Feb. 27, 2018

(54) BLADE CONTROL APPARATUS, WORK VEHICLE, AND METHOD OF CONTROLLING A BLADE

(71) Applicant: Komatsu Ltd., Tokyo (JP)

(72) Inventors: Daichi Noborio, Chigasaki (JP); Masaya Tanaka, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 27 days.

(21) Appl. No.: 14/428,470

(22) PCT Filed: Oct. 30, 2014

(86) PCT No.: PCT/JP2014/078977
§ 371 (c)(1),
(2) Date: Mar. 16, 2015

(87) PCT Pub. No.: WO2015/083469
PCT Pub. Date: Jun. 11, 2015

(65) Prior Publication Data
US 2016/0122969 A1 May 5, 2016

(51) Int. Cl.
*E02F 3/84* (2006.01)
*E02F 3/76* (2006.01)
(Continued)

(52) U.S. Cl.
CPC ............ *E02F 3/844* (2013.01); *E02F 3/7609* (2013.01); *E02F 3/7613* (2013.01);
(Continued)

(58) Field of Classification Search
CPC ......... E02F 3/844; E02F 3/7613; E02F 3/847; E02F 3/7609; E02F 9/262; E02F 3/7627; E02F 3/7631; G01S 19/49
See application file for complete search history.

(56) References Cited

U.S. PATENT DOCUMENTS

| 8,655,556 B2 * | 2/2014 | Hayashi ................ E02F 3/847 172/12 |
| 9,026,319 B2 | 5/2015 | Hayashi et al. |

(Continued)

FOREIGN PATENT DOCUMENTS

| CN | 103874804 A | 6/2014 |
| CN | 103906877 A | 7/2014 |

(Continued)

OTHER PUBLICATIONS

International Search Report and Written Opinion dated Feb. 3, 2015, issued for corresponding International Patent Application No. PCT/JP2014/078977.

*Primary Examiner* — Courtney D Heinle
(74) *Attorney, Agent, or Firm* — Locke Lord LLP; Howard M. Gitten

(57) ABSTRACT

The blade control apparatus includes outputting an instruction to operate a hydraulic cylinder, calculating a target height of the blade tip according to absolute position data, vehicle body inclination angle data, and designed surface data, acquiring target height data at a first point of time, calculating an actual height of the blade tip at the first point of time according to the absolute position data, the vehicle body inclination angle data, and the cylinder length data, and estimating an estimated height of the blade tip at a third point of time later than the first point of time, according to an instruction at a second point of time earlier than the first point of time, and actual height data of the blade tip at the first point of time or a point of time earlier than the first point of time.

8 Claims, 8 Drawing Sheets

(51) Int. Cl.
*G01S 19/49* (2010.01)
*E02F 9/26* (2006.01)

(52) U.S. Cl.
CPC .......... *E02F 3/7627* (2013.01); *E02F 3/7631* (2013.01); *E02F 3/847* (2013.01); *E02F 9/262* (2013.01); *G01S 19/49* (2013.01)

(56) References Cited

U.S. PATENT DOCUMENTS

| | | | |
|---|---|---|---|
| 2009/0069987 A1* | 3/2009 | Omelchenko | E02F 3/842 701/50 |
| 2012/0130602 A1 | 5/2012 | Omelchenko et al. | |
| 2014/0257646 A1* | 9/2014 | Ishibashi | E02F 3/844 701/50 |
| 2014/0277956 A1* | 9/2014 | Morin | E02F 3/844 701/50 |
| 2014/0345889 A1* | 11/2014 | Nakata | E02F 3/7613 172/1 |
| 2015/0019086 A1* | 1/2015 | Hayashi | E02F 3/844 701/50 |

FOREIGN PATENT DOCUMENTS

| | | |
|---|---|---|
| JP | 2010-539478 A | 12/2010 |
| JP | 5161403 B1 | 3/2013 |
| JP | 5285805 B1 | 9/2013 |
| JP | 2014-084683 A | 5/2014 |
| JP | 2014-173321 A | 9/2014 |

* cited by examiner

BLADE CONTROL APPARATUS, WORK VEHICLE, AND METHOD OF CONTROLLING A BLADE

FIELD

The present invention relates to a blade control apparatus, a work vehicle, and a method of controlling a blade.

BACKGROUND

A work vehicle with a blade is used for excavating the ground, leveling the land, transporting earth and sand, and the like. An example of a work vehicle that controls a blade tip to follow a designed surface is disclosed in Patent Literature 1 and Patent Literature 2. The designed surface is a three dimensionally designed profile of the ground targeted for the subject to be worked.

CITATION LIST

Patent Literature

Patent Literature 1: JP-5161403
Patent Literature 2: JP-5285805

SUMMARY

Technical Problem

A blade is operated by a hydraulic system. The hydraulic system is controlled by a control signal output from the blade control apparatus. A blade controlled to be at a target height with high responsiveness might not follow the changes in a vehicle speed and a blade load.

An object of an aspect of the present invention is to provide a blade control apparatus, a work vehicle, and a method of controlling a blade to work the ground to form a desired profile by improving the controllability of the blade.

Solution to Problem

According to a first embodiment of the present invention, a blade control apparatus configured to control a height of a blade tip of a blade supported on a vehicle body of a work vehicle so as to move in an up-and-down direction, the apparatus comprises: a blade control unit configured to output an operation instruction to operate a hydraulic cylinder that can move the blade in an up-and-down direction; a target height generating unit configured to calculate a target height of the blade tip based on absolute position data representing an absolute position of the vehicle body, vehicle body inclination angle data representing an inclination angle of the vehicle body, and designed surface data representing a designed surface that is a three dimensionally designed ground profile forming a target profile of a ground to be excavated; a target height data acquisition unit configured to acquire target height data representing a target height at a first point of time calculated in the target height generating unit; an actual height calculation unit configured to calculate an actual height of the blade tip at the first point of time based on the absolute position data at the first point of time, the vehicle body inclination angle data at the first point of time, and cylinder length data representing a stroke distance of the hydraulic cylinder at the first point of time; and an estimation unit configured to estimate an estimated height of the blade tip at a third point of time which is later than the first point of time, based on the operation instruction output from the blade control unit at a second point of time which is earlier than the first point of time, and actual height data representing an actual height of the blade tip at the first point of time or at a point of time earlier than the first point of time, wherein the blade control unit outputs a first operation instruction to reduce a difference between the estimated height and the target height at the first point of time based on the estimated height at the third point of time and the target height at the first point of time.

In the first embodiment of the present invention, the actual height calculation unit can calculate the actual height for a predetermined cycle, the second point of time can include a point of time earlier than the first point of time by one cycle, and the third point of time can include a point of time later than the first point of time by one cycle.

In the first embodiment of the present invention, the operation instruction at the second point of time can include a target cylinder speed instruction to the hydraulic cylinder, and the estimation unit can estimate the estimated height based on an actual height at the first point of time or a point of time earlier than the first point of time, an operation instruction at the second point of time, and the cycle.

In the first embodiment of the present invention, the blade control apparatus according can further comprise a blade load data acquisition unit configured to acquire blade load data representing a load on the blade, wherein the estimation unit can adjust a gain to calculate the estimated height based on the blade load data.

In the first embodiment of the present invention, the blade control apparatus can further comprise a determination unit configured to determine whether a first difference between the target height and the actual height at the first point of time is larger than a second difference between the target height and the actual height at the second point of time, wherein the blade control unit can output the first operation instruction when the first difference is determined to be smaller than the second difference, and the blade control unit can output a second operation instruction to reduce a difference between the actual height and the target height at the first point of time, when the first difference is determined to be larger than the second difference, based on the actual height at the first point of time and the target height at the first point of time.

In the first embodiment of the present invention, the blade control apparatus can further comprise a target height correction unit configured to estimate the target height at the third point of time based on the target height which the target height data acquisition unit acquires from the target height generating unit at the first point of time and the target height which the target height data acquisition unit acquires from the target height generating unit at the second point of time, wherein the blade control unit can output a first operation instruction to reduce a difference between the estimated height and the target height at the first point of time based on the estimated height at the third point of time and the target height at the third point of time estimated in the target height correction unit.

According to a second embodiment of the present invention, a work vehicle comprises: a vehicle body; a blade including a blade tip supported on the vehicle body so as to move in an up-and-down direction; and the blade control apparatus according to the first embodiment.

According to a third embodiment of the present invention, a method of controlling a blade by controlling a height of a blade tip of a blade supported on a vehicle body of a work vehicle so as to move in an up-and-down direction, the method comprises: outputting an operation instruction to operate a hydraulic cylinder that can move the blade in an up-and-down direction; calculating a target height of the blade tip based on absolute position data representing an absolute position of the vehicle body, vehicle body inclination angle data representing an inclination angle of the vehicle body, and designed surface data representing a designed surface that is a three dimensionally designed ground profile forming a target profile of a ground to be excavated; acquiring a target height data representing the target height at a first point of time; calculating an actual height of the blade tip at the first point of time based on the absolute position data at the first point of time, the vehicle body inclination angle data at the first point of time, and cylinder length data representing a stroke distance of the hydraulic cylinder at the first point of time; and estimating an estimated height of the blade tip at a third point of time, which is later than the first point of time, based on the operation instruction output at a second point of time, which is earlier than the first point of time, and an actual height data representing an actual height of the blade tip at the first point of time or at a point of time earlier than the first point of time, wherein a first operation instruction is output at the first point of time to reduce a difference between the estimated height and the target height based on the estimated height at the third point of time and the target height at the first point of time.

Advantageous Effects of Invention

According to an aspect of the present invention, a blade control apparatus, a work vehicle, and a method of controlling a blade to work the ground to form a desired profile by improving the controllability of the blade is provided.

DESCRIPTION OF EMBODIMENTS

Figure 1:
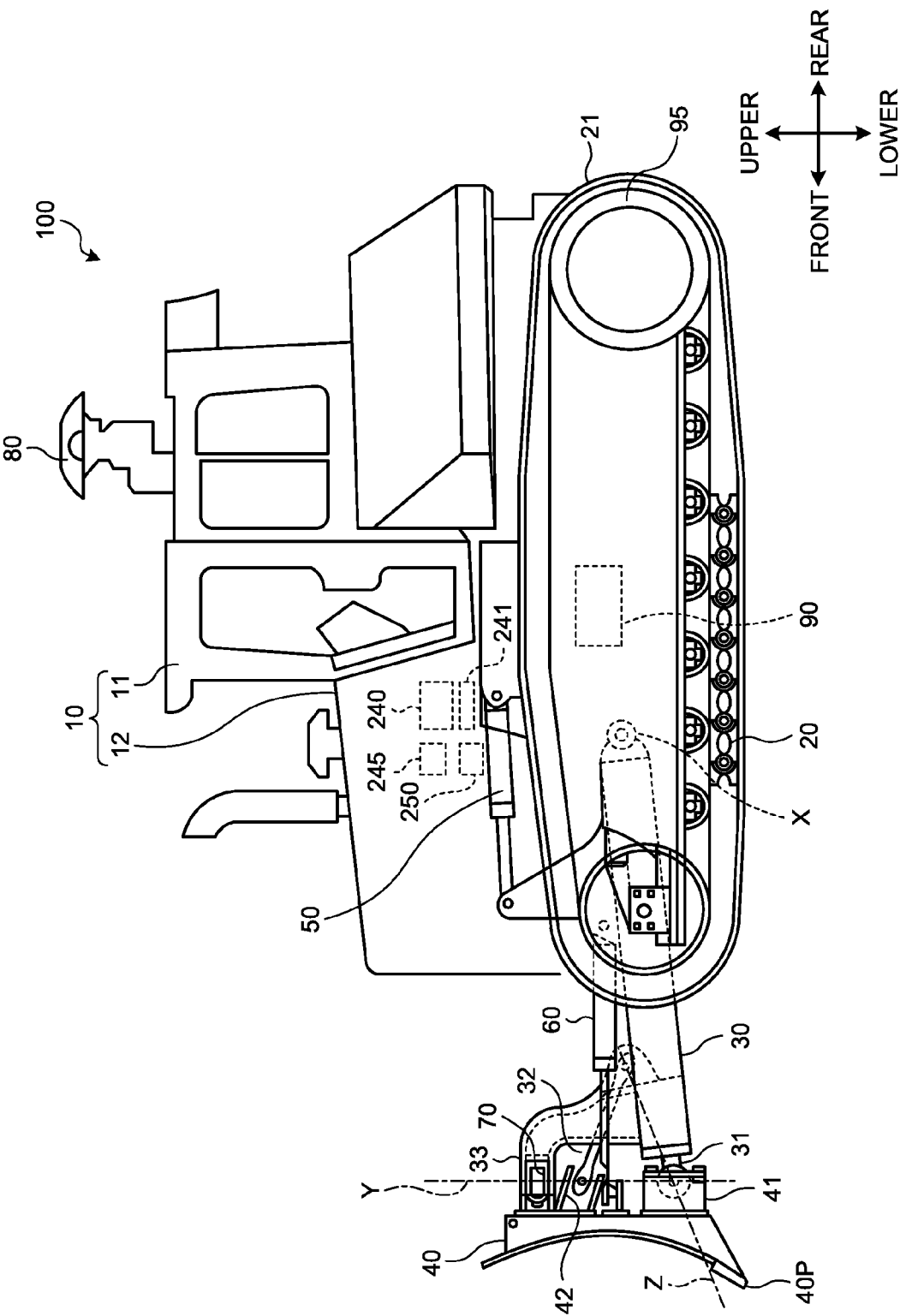
FIG. 1 is an example of a work vehicle according to an embodiment.

An embodiment according to the present invention will be described below referring to the drawings. The embodiment shall not limit the scope of the invention. The components of the embodiment described below can optionally be combined. There may be a case where some of the components are not used.

FIG. 1 is an example of a work vehicle 100 according to the embodiment. In the embodiment, the work vehicle 100, which is exemplarily a bulldozer 100, is described. The work vehicle 100 may be, for example, a motor grader.

In the description below, the positional relationship of components is described using terms "upper", "lower", "front", "rear", "left", and "right." The terms "upper", "lower", "front", "rear", "left", and "right" indicate the direction based on the operator seated in the driver's seat in a driver's room 11 of the bulldozer (work vehicle) 100.

Overall Configuration of the Bulldozer 100

The overall configuration of the bulldozer 100 according to the embodiment will be described. As illustrated in FIG. 1, the bulldozer 100 includes a vehicle body 10, a traveling apparatus 20, a lift frame 30, a blade 40, a lift cylinder 50, an angle cylinder 60, a tilt cylinder 70, a GPS receiver 80, an inertial measurement unit (IMU) 90, a sprocket 95, a hydraulic pump 240, a hydraulic motor 241, a hydraulic pump 245, and a hydraulic sensor 250.

The bulldozer 100 further includes a blade control apparatus 200. The blade control apparatus 200 controls the height of a blade tip 40P of the blade 40. The configuration and operation of the blade control apparatus 200 will be described later.

The vehicle body 10 includes a driver's room 11 and an engine room 12. A driver's seat is provided in the driver's room 11. Various manipulating devices are arranged in the driver's room 11. An operator sits in the driver's seat and can manipulate the manipulation devices. The engine room 12 is arranged in front of the driver's room 11.

The traveling apparatus 20 includes a crawler 21. The traveling apparatus 20 is arranged below the vehicle body 10. The sprocket 95 is driven to rotate the crawler 21 to drive the bulldozer 100.

The lift frame 30 is arranged within the traveling apparatus 20 along the width direction (right-and-left direction) of the vehicle. The vehicle body 10 supports the lift frame 30, allowing the lift frame 30 to pivot in the up-and-down direction about the axis X which is parallel to the width direction of the vehicle. The lift frame 30 supports the blade 40 via a ball joint 31, a pitch support link 32, and a supporting part 33.

The vehicle body 10 supports the blade 40 movable in the up and down direction. The vehicle body 10 supports the blade 40 via the lift frame 30. The blade 40 is arranged in front of the vehicle body 10. The blade 40 includes a universal joint 41 coupled to the ball joint 31 and a pitching joint 42 coupled to the pitch support link 32. The blade 40 ascends and descends along with the lift frame 30 pivoting in the up-and-down direction.

The blade 40 includes the blade tip 40P. The blade tip 40P is arranged at the bottom end of the blade 40. The blade tip 40P is inserted in the ground to work and excavate the ground.

The lift cylinder 50 is a hydraulic cylinder to move the blade 40 in the up-and-down direction (lifting direction). The lift cylinder 50 is coupled to the vehicle body 10 and the lift frame 30. The lift cylinder 50 extends and contracts to make the lift frame 30 and the blade 40 pivot in the up-and-down direction about the axis X.

The angle cylinder 60 is a hydraulic cylinder to move the blade 40 in rotational direction (angle direction). The angle cylinder 60 is coupled to the lift frame 30 and the blade 40. The angle cylinder 60 extracts and contracts to make the blade 40 pivot about the axis Y that intersects with each of the rotation axis of the universal joint 41 and the pitching joint 42.

The tilt cylinder 70 is a hydraulic cylinder to move the blade 40 in the rotational direction (tilt direction). The tilt cylinder 70 is coupled to the supporting part 33 of the lift frame 30 and the right upper portion of the blade 40. The tilt cylinder 70 extracts and contracts to tilt the blade 40 about the axis Z that intersects with the ball joint 31 and the bottom end of the pitch support link 32. The lift frame 30, the blade 40, the lift cylinder 50, the angle cylinder 60, and the tilt cylinder 70 are described as exemplary representations and are not limited to the configuration described above.

The GPS receiver 80 is arranged above the driver's room 11. The GPS receiver 80 is provided as an antenna for global positioning system (GPS). The GPS receiver 80 acquires GPS data (absolute position data) representing the absolute position of itself.

The inertial measurement unit (IMU 90) is an inertial measurement unit. The IMU 90 acquires vehicle body inclination angle data representing the inclination angles in the front-and-rear and right-and-left directions of the vehicle body 10.

The sprocket 95 is driven by the power of an engine (not shown) contained in the engine room 12 transmitted via a transmission. The transmission coupled to the engine transmits the shaft power produced by the rotational motion in the engine to the sprocket 95. The sprocket 95 is thereby driven. The sprocket 95 drives the traveling apparatus 20 to operate.

In the embodiment, the hydraulic pump 240 serves as a hydraulic pump driving the traveling apparatus 20 (hydraulic pump for traveling). The hydraulic pump 240 is coupled to the engine. The hydraulic motor 241 serves as a hydraulic motor driving the traveling apparatus 20 (hydraulic motor for traveling). The hydraulic motor 241 is coupled to the sprocket 95. The transmission includes a hydraulic static transmission (HST) including the hydraulic pump 240 coupled to the engine and the hydraulic motor 241 coupled to the sprocket 95. The hydraulic pump 240 supplies working fluid to the hydraulic motor 241. The hydraulic motor 241 thereby operates and drives the sprocket 95.

The hydraulic pump 240 operates to supply the working fluid to the hydraulic motor 241. The hydraulic motor 241 produces power with the supplied working fluid. The power produced by the hydraulic motor 241 is transmitted to the sprocket 95 coupled to the hydraulic motor 241.

The transmission may not necessarily be the HST. The transmission may be a torque converter or a diesel electric transmission including a generator and a motor in place of the hydraulic pump 240 and the hydraulic motor 241. A planetary gear mechanism may be combined with the aforementioned mechanism.

The hydraulic pump 245 serves as a hydraulic pump operating the blade 40 (hydraulic pump for work machine). The hydraulic pump 245 supplies the working fluid to the lift cylinder 50. The lift cylinder 50 thereby operates. The hydraulic pump 245 supplies the working fluid to the angle cylinder 60. The angle cylinder 60 thereby operates. The hydraulic pump 245 supplies the working fluid to the tilt cylinder 70. The tilt cylinder 70 thereby operates.

The hydraulic sensor 250 detects the pressure of the working fluid supplied from the hydraulic pump 245 to the lift cylinder 50. The hydraulic sensor 250 acquires pressure data representing the working fluid pressure. The pressure detected by the hydraulic sensor 250 changes according to the traction of the traveling apparatus 20. The load on the blade 40 (blade load) is calculated according to the pressure detected by the hydraulic sensor 250. Thus in the embodiment, the hydraulic sensor 250 functions as a blade load sensor for acquiring blade load data representing the load on the blade.

The hydraulic sensor 250 may be configured to detect the pressure of the working fluid supplied from the hydraulic pump 240 to the hydraulic motor 241. The hydraulic sensor 250 acquires pressure data representing the working fluid pressure. The pressure detected by the hydraulic sensor 250 changes according to the load on the blade 40. The load on the blade 40 (blade load) is calculated according to the pressure detected by the hydraulic sensor 250. The hydraulic sensor 250 is configured to detect the pressure of the working fluid supplied to the lift cylinder 50 also functions as a blade load sensor for acquiring blade load data representing the load on the blade.

The blade load sensor may include a drive torque sensor for detecting the drive torque of the sprocket 95. The drive torque of the sprocket 95 changes according to the traction of the traveling apparatus 20. The blade load is calculated according to the drive torque detected by the drive torque sensor. The blade load data may include drive torque data representing the drive torque of the sprocket 95.

Figure 2:
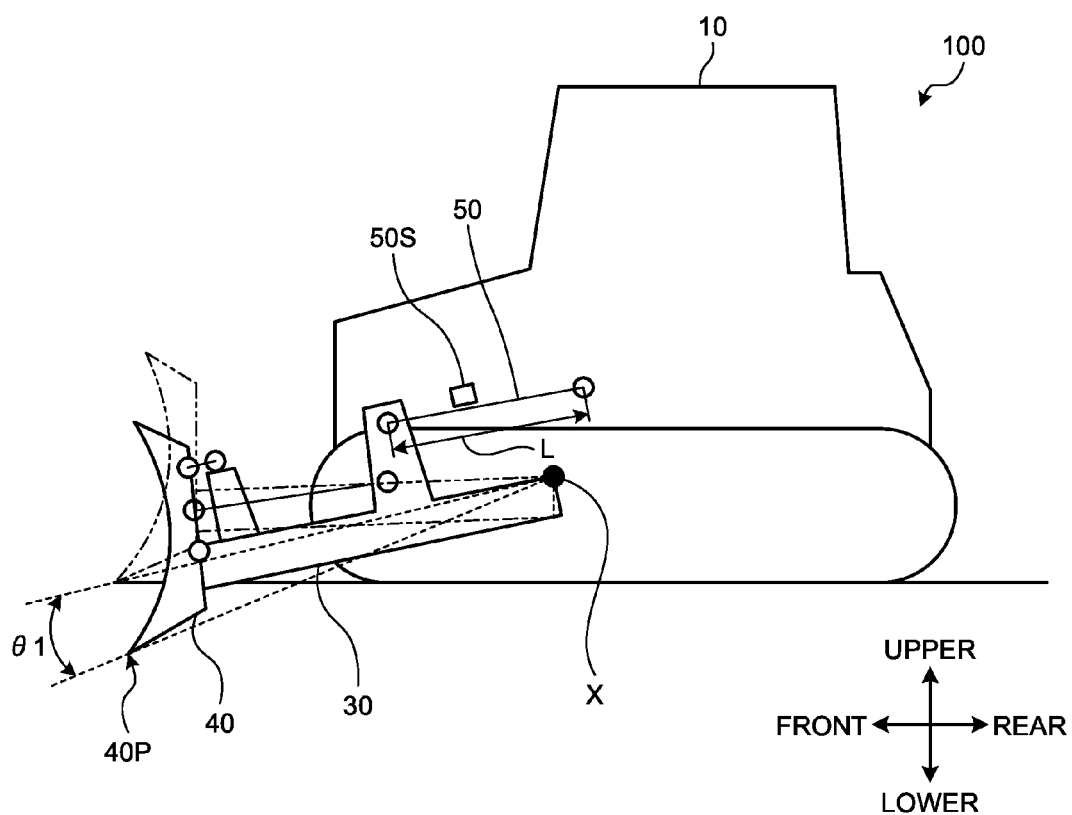
FIG. 2 schematically illustrates the work vehicle according to the embodiment.

FIG. 2 schematically illustrates the bulldozer 100 according to the embodiment. The original position of the lift frame 30 is shown in phantom lines in FIG. 2. When the lift frame 30 is at the original position, the blade tip 40P of the blade 40 touches the ground.

As illustrated in FIG. 2, the bulldozer 100 includes a lift cylinder sensor 50S. The lift cylinder sensor 50S includes a spin roller for detecting the position of the rod and a magnetic sensor used to return the rod to the original position. The lift cylinder sensor 50S detects the stroke distance L of the lift cylinder 50. Hereinafter, the stroke distance L of the lift cylinder 50 is referred to as lift cylinder length L as required. The lift cylinder sensor 50S acquires lift cylinder length data representing the stroke distance (lift cylinder length) L of the lift cylinder 50.

A lift angle θ of the blade 40 is calculated according to the lift cylinder length data. The lift angle θ represents the lowering angle of the blade 40 from the original position which corresponds to the intrusion depth of the blade tip 40P. The bulldozer 100 travels forward with the blade 40 lowered from the original position to work and excavate the ground.

The bulldozer 100 further includes an angle cylinder sensor for detecting the stroke distance (angle cylinder length) of the angle cylinder 60 and a tilt cylinder sensor for detecting the stroke distance (tilt cylinder length) of the tilt cylinder 70. Each of the angle cylinder sensor and the tilt cylinder sensor includes a spin roller for detecting the position of the rod and a magnetic sensor used to return the rod to the original position. The angle cylinder sensor acquires angle cylinder length data representing the angle cylinder length. The tilt cylinder sensor acquires tilt cylinder length data representing the tilt cylinder length.

Hereinafter, the description will be made mainly on the usage of the lift angle θ and the description on the usage of the angling angle and the tilting angle will be omitted.

Configuration of Blade Control Apparatus 200

Figure 3:
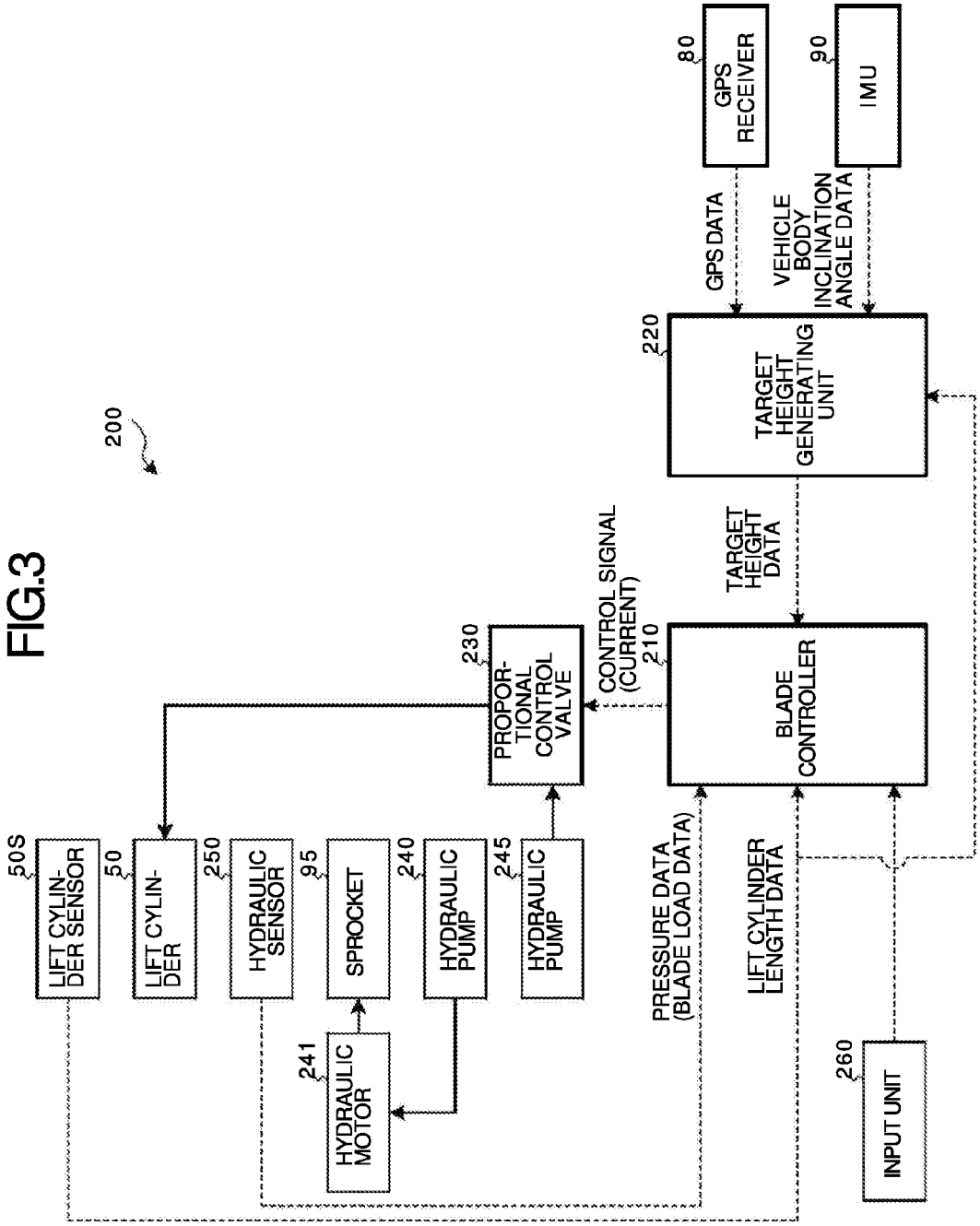
FIG. 3 is a block diagram illustrating an example of a blade control apparatus according to the embodiment.

An example of the blade control apparatus 200 according to the embodiment will be described. FIG. 3 is a block diagram illustrating an example of the blade control apparatus 200 according to the embodiment.

The blade control apparatus 200 includes the lift cylinder 50, the sprocket 95, a proportional control valve 230, the hydraulic pump 240, the hydraulic motor 241, the hydraulic pump 245, and an input unit 260. The blade control apparatus 200 includes the hydraulic sensor 250, the lift cylinder sensor 50S, the GPS receiver 80, and the IMU 90. The blade control apparatus 200 includes a blade controller 210 and a target height generating unit 220.

The hydraulic pump 240 serves as a hydraulic pump to drive the traveling apparatus 20 (hydraulic pump for traveling). The hydraulic pump 240 is coupled to the engine. The hydraulic motor 241 serves as a hydraulic motor driving the traveling apparatus 20 (hydraulic motor for traveling). The hydraulic motor 241 is coupled to the sprocket 95. The transmission includes a hydraulic static transmission (HST) including the hydraulic pump 240 coupled to the engine and the hydraulic motor 241 coupled to the sprocket 95. The hydraulic pump 240 supplies working fluid to the hydraulic motor 241. The hydraulic motor 241 thereby operates and drives the sprocket 95. The hydraulic pump 240 operates to supply the working fluid to the hydraulic motor 241. The hydraulic motor 241 produces power with the supplied working fluid. The power produced by the hydraulic motor 241 is transmitted to the sprocket 95 coupled to the hydraulic motor 241. The traveling apparatus 20 thereby travels.

The hydraulic pump 245 serves as a hydraulic pump operating the blade 40 (hydraulic pump for work machine). The proportional control valve 230 is arranged between the lift cylinder 50 and the hydraulic pump 245. The hydraulic pump 245 supplies the working fluid to the lift cylinder 50 via the proportional control valve 230. The proportional control valve 230 controls the working fluid to operate the lift cylinder 50. The input unit 260 includes a manipulation lever and a deceleration pedal operated by an operator.

The blade controller 210 includes a computer system having a processor such as a CPU. The target height generating unit 220 includes a computer system having a processor such as a CPU.

The blade controller 210 outputs an operation instruction to operate the lift cylinder 50 that can move the blade 40 in the up-and-down direction. The blade controller 210 outputs a control signal based on the operation instruction to the proportional control valve 230 that controls the working fluid to be supplied to the lift cylinder 50.

In response to the operation made to the manipulation lever of the input unit 260, the blade controller 210 gives instruction to operate the blade and to swing by individually operating the right-and-left traveling apparatuses 20. In response to the operation made to the deceleration pedal of the input unit 260, the blade controller 210 controls the output of the transmission to change the vehicle speed.

The target height generating unit 220 calculates the target height data representing the target position of the blade tip 40P.

The hydraulic sensor 250 transmits pressure data (blade load data) to the blade controller 210.

The lift cylinder sensor 50S transmits the lift cylinder length data representing the lift cylinder length L of the lift cylinder 50 to the blade controller 210.

The GPS receiver 80 transmits the GPS data to the target height generating unit 220. The target height generating unit 220 transmits the GPS data to the blade controller 210. The GPS receiver 80 may be configured to transmit the GPS data to the blade controller 210.

The IMU 90 transmits the vehicle body inclination angle data representing the inclination angle of the bulldozer 100, such as a pitch angle and a roll angle in the absolute coordinate system, to the target height generating unit 220. The target height generating unit 220 transmits the vehicle body inclination angle data to the blade controller 210. The IMU 90 may be configured to transmit the vehicle body inclination angle data to the blade controller 210.

The blade controller 210 acquires the blade load data (pressure data) from the hydraulic sensor 250. The blade controller 210 acquires the lift cylinder length data from the lift cylinder sensor 50S. The blade controller 210 acquires the GPS data from the GPS receiver 80. The blade controller 210 acquires the vehicle body inclination angle data from the IMU 90.

According to the GPS data (absolute position data), the blade controller 210 calculates the GPS position (absolute position) of the GPS receiver 80 in the global coordinate system. The global coordinate system is a coordinate system with its origin (absolute reference point) fixed on the earth.

The blade controller 210 calculates the lift angle θ (see FIG. 2) of the blade 40 according to the lift cylinder length data. The blade controller 210 performs coordinate transformation from the global coordinate system to the local coordinate system according to the lift angle θ and the vehicle body dimensional data and then calculates the position (relative position) of the blade tip 40P of the blade 40 with reference to the GPS receiver 80 in the local coordinate system. The local coordinate system is a coordinate system with its origin (vehicle body reference point) fixed on the vehicle body 10 of the bulldozer 100. The local coordinate system may be referred to as vehicle main body coordinate system.

The vehicle body dimensional data is a known data and is stored in the blade controller 210 in advance. The blade controller 210 calculates the position (actual height) of the blade tip 40P in the global coordinate system according to the GPS data representing the absolute position of the GPS receiver 80 in the global coordinate system, the local position data representing the position of the blade tip 40P relative to the GPS receiver 80 in the local coordinate system, and the vehicle body inclination angle data representing the inclination angle of the vehicle body 10. That is, the blade controller 210 calculates the actual position (actual height) of the blade tip 40P according to the GPS data (absolute position data) representing the GPS position (absolute position) of the vehicle body 10, the vehicle body inclination angle data representing the inclination angle of the vehicle body 10, and the lift cylinder length data representing the stroke distance of the lift cylinder 50.

The target height generating unit 220 acquires the GPS data from the GPS receiver 80. The target height generating unit 220 acquires the vehicle body inclination angle data from the IMU 90.

The target height generating unit 220 stores in advance the designed surface data representing the designed surface, that is, a three dimensionally designed ground profile forming a target profile of the ground to be excavated in the work area. According to the vehicle body dimensional data, the lift angle θ calculated from the cylinder length data, the GPS data, the vehicle body inclination angle data, and the designed surface data, the target height generating unit 220 performs coordinate transformation from the global coordinate system to the local coordinate system to calculate the target position (target height) of the blade tip 40P in the local coordinate system.

The target height generating unit 220 transmits the target height data representing the calculated target height to the blade controller 210. The blade controller 210 acquires the target height data. The blade controller 210 outputs a control signal in response to an operation instruction to a proportional control valve 230 to reduce the difference between the estimated height and the target height. The control signal includes a current. The blade controller 210 outputs the control signal to the proportional control valve 230, where the control signal is a current corresponding to the current obtained according to the actual height and the target height.

As will be described below, the blade controller 210 estimates the future height (estimated height) of the blade tip 40P. The blade controller 210 outputs a control signal in response to the operation instruction to the proportional control valve 230 to reduce the difference between the estimated height and the target height. The control signal includes a current. The blade controller 210 outputs the control signal to the proportional control valve 230, where the control signal is a current corresponding to the current obtained according to the estimated height and the target height.

The rate of opening of the proportional control valve 230 is controlled with a current, or a control signal, output from the blade controller 210. The current, or the control signal, output from the blade controller 210 can be adjusted by the input unit 260.

Figure 4:
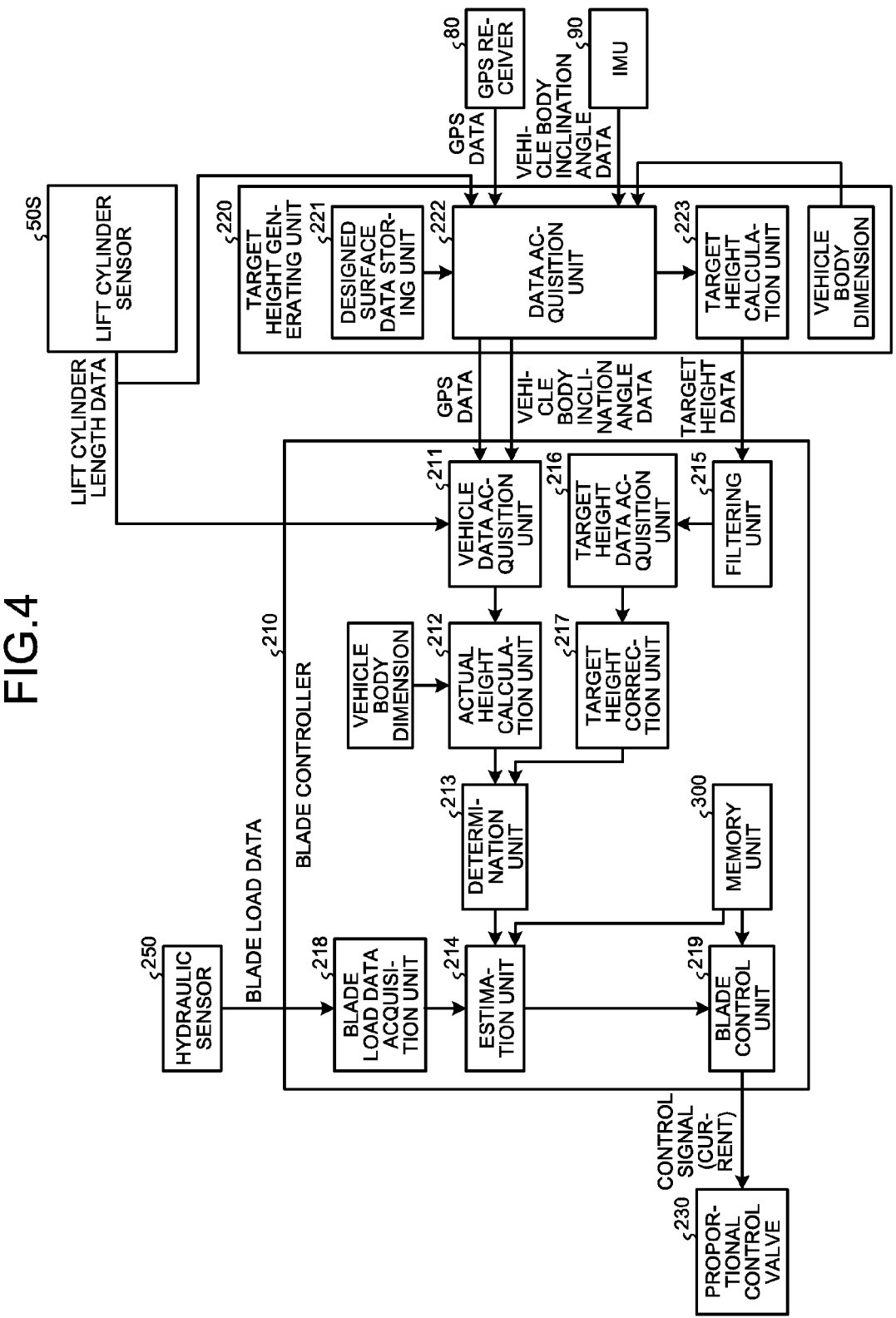
FIG. 4 is a functional block diagram illustrating an example of a blade controller and a target height generating unit according to the embodiment.

Now the function of the blade controller 210 and the target height generating unit 220 according to the embodiment will be described. FIG. 4 is a functional block diagram illustrating an example of the blade controller 210 and the target height generating unit 220 according to the embodiment.

Function of Blade Controller 210

As illustrated in FIG. 4, the blade controller 210 includes a vehicle data acquisition unit 211, an actual height calculation unit 212, a determination unit 213, an estimation unit 214, a filtering unit 215, a target height data acquisition unit 216, a target height correction unit 217, a blade load data acquisition unit 218, a blade control unit 219, and a memory unit 300.

The target height generating unit 220 includes a designed surface data storing unit 221, a data acquisition unit 222, and a target height calculation unit 223.

The vehicle data acquisition unit 211 acquires the GPS data from the GPS receiver 80. The vehicle data acquisition unit 211 acquires the vehicle body inclination angle data from the IMU 90. The vehicle data acquisition unit 211 acquires the lift cylinder length data from the lift cylinder sensor 50S.

The actual height calculation unit 212 calculates the actual height (actual elevation) of the blade tip 40P according to the vehicle body dimensional data, the GPS data, the vehicle body inclination angle data, and the lift cylinder length data.

The determination unit 213 makes a predetermined determination according to the difference between the target height and the actual height of the blade tip 40P.

The estimation unit 214 estimates the estimated future height of the blade tip 40P according to the previously output operation instruction and the present actual height of the blade tip 40P.

The filtering unit 215 filters the target height data representing the target height transmitted from the target height generating unit 220. In the embodiment, the filtering unit 215 includes a Kalman filter.

The target height data acquisition unit 216 acquires the target height data representing the target height calculated in the target height generating unit 220. In the embodiment, the target height data acquisition unit 216 acquires the target height data filtered in the filtering unit 215.

The target height correction unit 217 estimates the future target height according to the past target height and the present target height.

The determination unit 213 makes a predetermined determination, which will be described later, according to the future target height of the blade tip 40P estimated in the target height correction unit 217 and the present actual height of the blade tip 40P calculated in the actual height calculation unit 212.

The blade load data acquisition unit 218 acquires the blade load data representing the load on the blade 40 from the hydraulic sensor 250.

According to the future estimated height of the blade tip 40P estimated in the estimation unit 214 and the present target height of the blade tip 40P, the blade control unit 219 outputs a control signal in response to the operation instruction to the proportional control valve 230 to reduce the difference between the estimated height and the target height.

The memory unit 300 stores various maps used for control made by the blade controller 210. In the embodiment, the memory unit 300 stores a map representing the relationship between a current, or a control signal, output to the proportional control valve 230 and the cylinder speed of the lift cylinder 50 at when the current is supplied to the proportional control valve 230.

Function of Target Height Unit 220

The designed surface data storing unit 221 stores in advance the designed surface data representing the designed surface, that is, the three dimensionally designed ground profile forming a target profile of the ground to be excavated.

The data acquisition unit 222 acquires the GPS data from the GPS receiver 80. The data acquisition unit 222 acquires the vehicle body inclination angle data from the IMU 90. The data acquisition unit 222 acquires the designed surface data from the designed surface data storing unit 221.

The target height calculation unit 223 calculates the target height of the blade tip 40P according to the GPS data representing the absolute position of the vehicle body 10, the vehicle body inclination angle data representing the inclination angle of the vehicle body 10, and the designed surface data representing the designed surface, that is, the three dimensionally designed ground profile forming a target profile of the ground to be excavated. The target height calculation unit 223 transmits the target height data representing the calculated target height to the filtering unit 215.

In the embodiment, when the target height data acquisition unit 216 acquires the target height data representing the target height at a first point of time (present point of time) calculated in the target height calculation unit 223 of the target height generating unit 220, the estimation unit 214 estimates the estimated height of the blade tip 40P at a third point of time (future point of time), which is later than the first point of time, according to the operation instruction output from the blade controller 210 at a second point of time (past point of time), which is earlier than the first point of time, and the actual height data representing the actual height of the blade tip 40P at the first point of time.

According to the estimated height at the third point of time and the target height at the first point of time, the blade control unit 219 outputs the operation instruction to reduce the difference between the estimated height and the target height at the first point of time.

In the embodiment, the target height calculation unit 223 calculates the target height for a predetermined cycle (for example, at every 10 milliseconds). The actual height calculation unit 212 calculates the target height for a predetermined cycle (for example, at every 10 milliseconds). The second point of time (past point of time) is earlier than the first point of time (present point of time) by, for example, one cycle (a point of time 10 milliseconds earlier). The third point of time (future point of time) is later than the first point of time (present point of time) by, for example, one cycle (a point of time 10 milliseconds later).

When the difference between the actual height and the target height has a predetermined relationship, the blade control unit 219 outputs the operation instruction according to the estimated height and the target height. When the difference between the actual height and the target height does not have a predetermined relationship, the blade control unit 219 outputs the operation instruction according to the actual height and the target height.

The determination unit 213 determines whether the difference between the actual height and the target height has a predetermined relationship. In the embodiment, the determination unit 213 determines whether a first difference between the target height at the first point of time and the actual height at the first point of time is larger than a second difference between the target height at the second point of time and the actual height at the second point of time.

When it is determined that the first difference is smaller than the second difference, the blade control unit 219 outputs the operation instruction to reduce the difference between the estimated height and the target height at the first point of time according to the estimated height at the third point of time and the target height at the first point of time.

When it is determined that the first difference is larger than the second difference, the blade control unit 219 outputs the operation instruction to reduce the difference between the actual height and the target height at the first point of time according to the actual height at the first point of time and the target height at the first point of time.

The target height correction unit 217 estimates the target height at the third point of time (corrected target height) according to the target height which the target height data acquisition unit 216 acquires from the target height generating unit 220 at the first point of time and the target height which the target height data acquisition unit 216 acquires from the target height generating unit 220 at the second point of time.

In the embodiment, the estimated target height (corrected target height) is used as the target height at the first point of time.

The determination unit 213 determines whether the first difference between the target height at the first point of time (corrected target height) and the actual height at the first point of time is larger than the second difference between the target height at the second point of time and the actual height at the second point of time.

When the determination unit 213 determines that the first difference is smaller than the second difference, the blade control unit 219 outputs the operation instruction to reduce the difference between the estimated height and the target height at the first point of time according to the estimated height and the target height estimated in the target height correction unit 217.

When the determination unit 213 determines that the first difference is larger than the second difference, the blade control unit 219 outputs the operation instruction to reduce the difference between the actual height and the target height at the first point of time according to the actual height and the target height estimated in the target height correction unit 217.

Method of Controlling Blade

Figure 5:
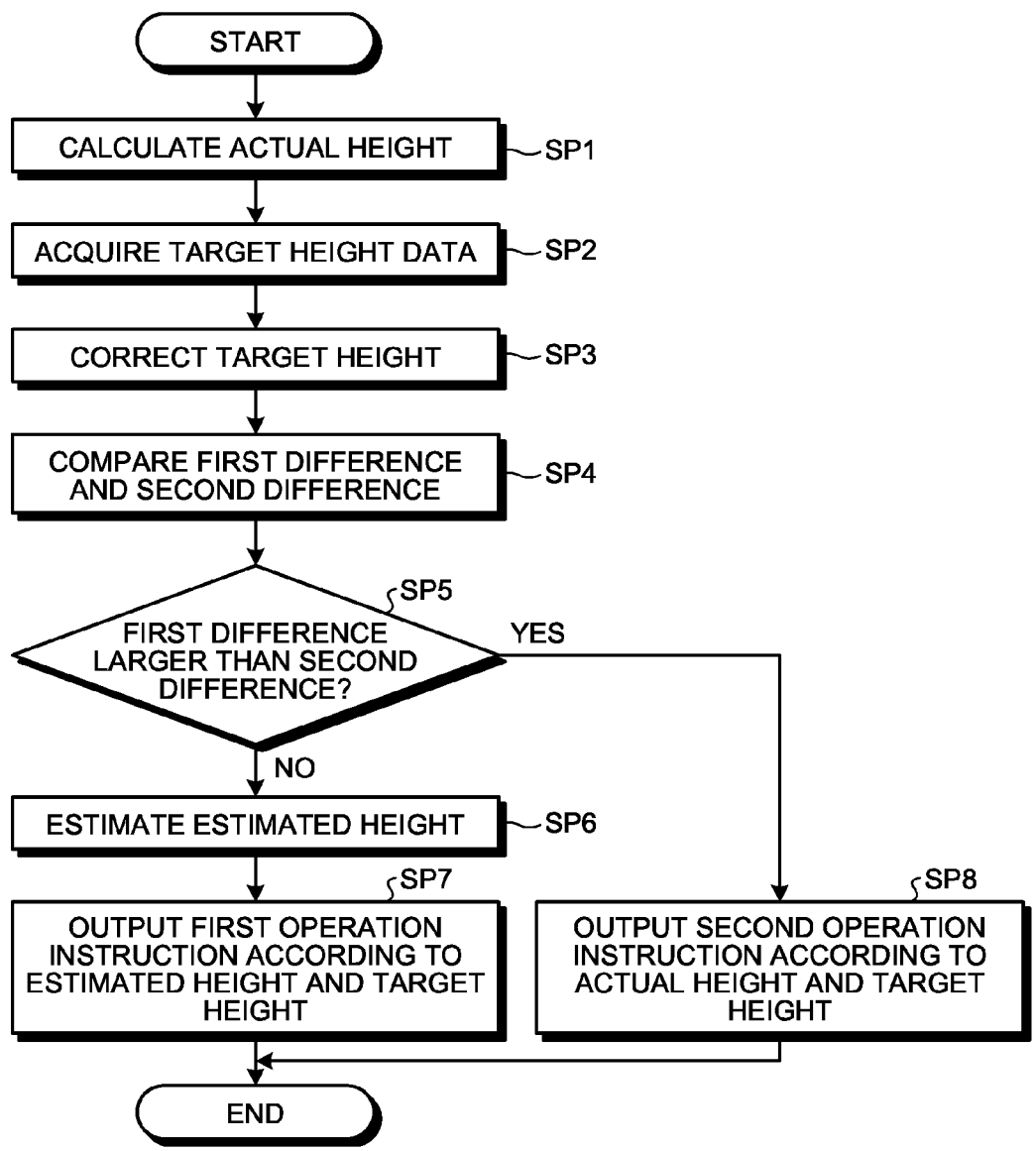
FIG. 5 is a flowchart illustrating an example of a method of controlling a blade according to the embodiment.

A method of controlling a blade according to the embodiment will be described. FIG. 5 is a flowchart illustrating an example of a method of controlling a blade according to the embodiment.

The vehicle data acquisition unit 211 acquires the GPS data, the vehicle body inclination angle data, and the lift cylinder length data. The actual height calculation unit 212 calculates the actual height of the blade tip 40P at the first point of time according to the GPS data at the first point of time, the vehicle body inclination angle data at the first point of time, and the cylinder length data at the first point of time (step SP1). In the embodiment as described above, the actual height calculation unit 212 calculates the actual height of the blade tip 40P for a predetermined cycle (for example, at every 10 milliseconds).

The data acquisition unit 222 acquires the GPS data, the vehicle body inclination angle data, and the designed surface data. The target height calculation unit 223 calculates the target height of the blade tip 40P according to the GPS data, the vehicle body inclination angle data, and the cylinder length data. In the embodiment as described above, the target height calculation unit 223 calculates the target height of the blade tip 40P for a predetermined cycle (for example, at every 10 milliseconds). The target height data representing the target height calculated in the target height calculation unit 223 is transmitted to the blade controller 210 for a predetermined cycle (at every 10 milliseconds).

The target height data acquisition unit 216 acquires the target height data representing the target height at the first point of time calculated in the target height generating unit 220 via the filtering unit 215 (step SP2).

Thus, the blade controller 210 acquires the actual height data at the first point of time and the target height data at the first point of time.

In the embodiment as described above, the filtering unit 215 filters the target height data and the resulting target height data is acquired by the target height data acquisition unit 216. As for the filtering unit 215, it is desirable to select a filter with a small time lag such as a Kalman filter.

If the bulldozer 100 travels on the rough ground in the work area, the inclination angle of the vehicle body 10 changes every second. Along with the change in the inclination angle of the vehicle body 10, the target height data calculated in the target height calculation unit 223 also changes every second. When the blade 40 is controlled using the hydraulic system including the lift cylinder 50 and the proportional control valve 230 according to the target height data that changes every second, the blade 40 might fail to follow the change and result in uncontrolled state such as hunting. In the embodiment, the target height data is filtered and the filtered target height data is used to control the blade 40. The occurrence of an uncontrolled state can thereby be suppressed.

Figure 6:
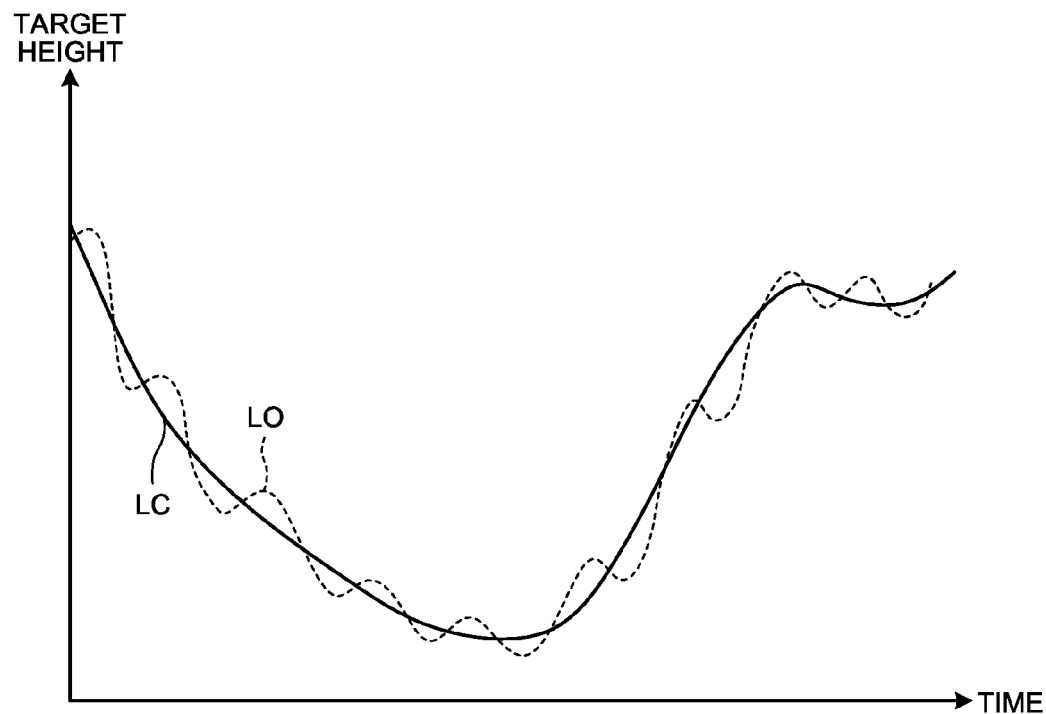
FIG. 6 is a chart explaining an example of a target height according to the embodiment.

FIG. 6 explains the effect of the filtering unit 215. In FIG. 6, the line LO represents the target height data output from the target height calculation unit 223. As the line LO shows, the target height data output from the target height calculation unit 223 also changes every second along with the change in the inclination angle of the vehicle body 10.

In FIG. 6, the line LC represents the target height data filtered in the filtering unit 215 which may be a Kalman filter. That is, the line LC represents the target height data output from the filtering unit 215 to the target height data acquisition unit 216. As the line LC shows, the filtering unit 215 which may be a Kalman filter transforms the target height into a smooth data without causing a large delay. The filtered target height data is used to control the blade 40, thereby suppressing the occurrence of an uncontrolled state.

Referring back to FIG. 5, the target height data acquired by the target height data acquisition unit 216 is transmitted to the target height correction unit 217. The target height correction unit 217 corrects the target height data supplied from the target height data acquisition unit 216 (step SP3).

For example, a delay in calculating the target height in the target height generating unit 220 or a delay in the target height generating unit 220 transmitting the target height data to the blade controller 210 may occur. As described above, the target height data is calculated according to the GPS data and the vehicle body inclination angle data or the like. When a delay in transmission from the target height generating unit 220 to the blade controller 210 occurs, for example, the blade controller 210 controls the blade 40 to reduce the deviation from the target height data according to the vehicle body inclination angle data at a point of time earlier by one cycle (at a point of time 10 milliseconds earlier). The inclination angle of the vehicle body 10 changes every second. Thus, if the blade 40 is controlled using the target height data according to the past vehicle body inclination angle data, the blade 40 might fail to properly follow the designed surface. For example, at a certain vehicle speed, the blade may ascend and descend (undulate) regardless of an intention of an operator.

In the embodiment, to suppress the occurrence of an uncontrolled state caused by the delay in the target height generating unit 220, the blade controller 210 corrects the target height data supplied from the target height generating unit 220 to generate the target height data (corrected target height data).

Figure 7:
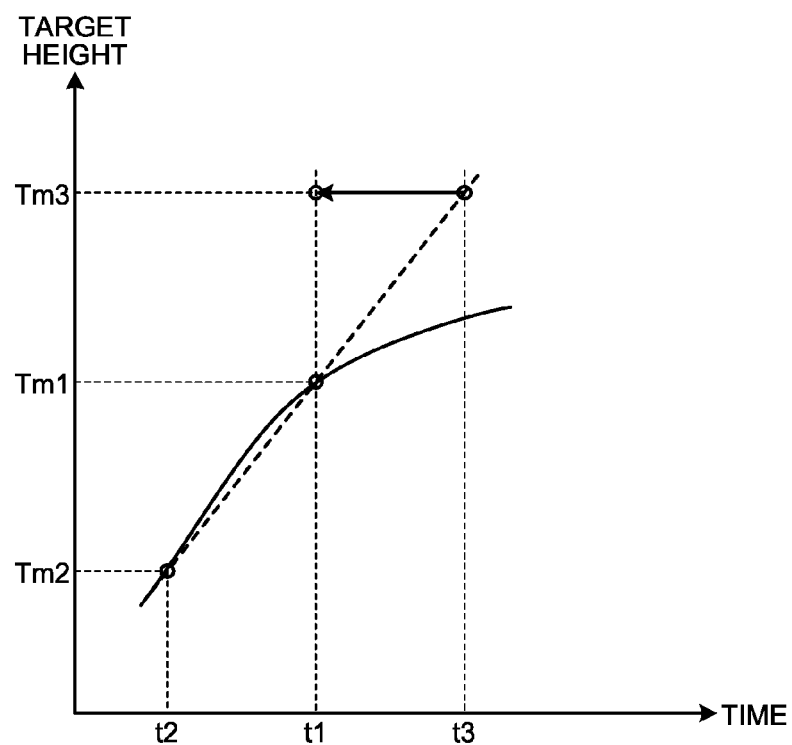
FIG. 7 is a chart explaining an example of a target height according to the embodiment.

FIG. 7 is a chart explaining an example of the corrected target height. Provided that, as illustrated in FIG. 7, the target height data acquisition unit 216 acquires the target height data Tm1 from the target height generating unit 220 at the first point of time (present point of time) t1 and the target height data acquisition unit 216 acquires the target height data Tm2 from the target height generating unit 220 at the second point of time (past point of time) t2 which is earlier than the first point of time t1. The target height correction unit 217 estimates the target height data Tm3 at the third point of time (future point of time) t3 which is later than the first point of time t1.

In the embodiment, the target height correction unit 217 performs the calculation expressed in Equation (1).

$$Tm3=Tm1+(Tm1-Tm2)\times G \quad (1)$$

The variable G in Equation (1) indicates the gain. In the embodiment, the blade controller 210 uses the target height data (corrected target height data) Tm3 to output the control signal in response to the operation instruction for controlling the blade 40 at the first point of time t1. That is, the blade controller 210 determines the target height data Tm3 as the target height at the first point of time t1 to perform control.

Note that, the target height at the future point of time (the third point of time) is determined from the target height data at the present point of time (the first point of time) and the target height data at the past point of time (the second point of time). The target height at the future point of time may be determined from the target height data at a past point of time (for example, the second point of time) and the target height data at a past point of time earlier than the former past point of time.

The actual height data Tr1 at the first point of time t1 calculated in the actual height calculation unit 212 and the target height data Tm3 at the first point of time t1 corrected in the target height correction unit 217 are transmitted to the determination unit 213. The determination unit 213 compares a first difference Δ1 between the target height data Tm3 at the first point of time t1 and the actual height data Tr1 at the first point of time t1 and a second difference Δ2 between the target height data Tm2 at the second point of time t2 and the actual height data Tr2 at the second point of time t2 (step SP4).

The determination unit 213 determines whether the first difference Δ1 between the target height data Tm3 at the first point of time t1 and the actual height data Tr1 at the first point of time t1 is larger than the second difference Δ2 between the target height data Tm2 at the second point of time t2 and the actual height data Tr2 at the second point of time t2 (step SP5).

If it is determined that the first difference Δ1 is smaller than the second difference Δ2 (NO: in step SP5), the estimation unit 214 estimates the estimated height (step SP6).

If it is determined that the first difference Δ1 is larger than the second difference Δ2, the first difference Δ1 is equal to the second difference Δ2, or the first difference Δ1 is equal to or larger than a predetermined threshold (YES: in step SP5), the estimation unit 214 performs no estimation of the estimated height and the blade control unit 219 outputs the operation instruction, according to the actual height data Tr1 at the first point of time t1 and the target height data Tm1 at the first point of time t1, to reduce the difference between the actual height data Tr1 and the target height data Tm1 at the first point of time t1 (step SP8).

The estimation of the estimated height of a blade tip 40P performed in the estimation unit 214 will be described referring to FIG. 8.

A typical hydraulic mechanism such as the lift cylinder 50 has a dead time occurring in a hydraulic system. If a dead time effecting the control signal exists in the hydraulic system, it may be difficult to make the blade tip 40P of the blade 40 follow the designed surface. If a gain is increased to improve responsiveness, the dead time causes an overshoot, which may make the blade tip 40P of the blade 40 difficult to follow the designed surface.

In the embodiment, the estimated height data Tr3 of the blade tip 40P at the third point of time t3, which is later than the first point of time t1, is estimated without using the actual height data Tr1 of the blade tip 40P at the first point of time t1. The resulting estimated height data Tr3 is used output the operation instruction to control the blade 40.

By estimating the estimated height data Tr3 and performing control using the resulting estimated height data Tr3 at the first point of time t1, the blade tip 40P can be positioned close to the target height even when a dead time exists in the hydraulic system.

Figure 8:
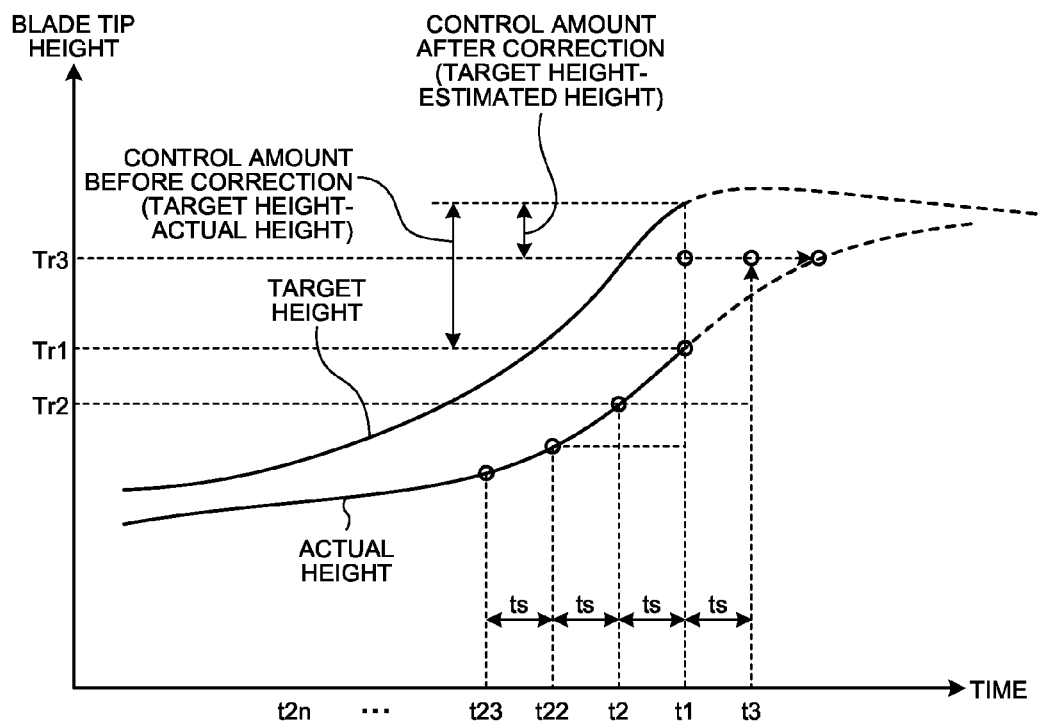
FIG. 8 is a chart explaining an example of an estimated height according to the embodiment.

As illustrated in FIG. 8, the actual height data Tr1 of the blade tip 40P at the first point of time t1 is calculated. The actual height data Tr2 of the blade tip 40P at the second point of time t2, which is earlier than the first point of time t1, is calculated. The blade control unit 219 outputs the operation instruction at the second point of time t2.

The estimation unit 214 estimates the estimated height data Tr3 representing the estimated height of the blade tip 40P at the third point of time t3, which is later than the first point of time t1, according to the operation instruction output from the blade control unit 219 at the second point of time t2 and the actual height data Tr1 representing the actual height of the blade tip 40P at the first point of time t1.

In the embodiment, the operation instruction includes the target cylinder speed instruction of the lift cylinder 50. The memory unit 300 stores a map representing the relationship between a current, or a control signal, output to the proportional control valve 230 and the cylinder speed of the lift cylinder 50 at when the current is supplied to the proportional control valve 230. According to the map in the memory unit 300, the blade control unit 219 outputs the control signal (a current) to the proportional control valve 230 to operate the lift cylinder 50 at a target cylinder speed.

In the embodiment, the operation instruction at the second point of time t2 includes the target cylinder speed instruction of the lift cylinder 50 at the second point of time t2. The estimation unit 214 estimates the estimated height data Tr3 according to the actual height data Tr1 at the first point of time t1, the target cylinder speed (instructed speed) Vr2 at the second point of time t2, and a cycle ts (10 milliseconds in the embodiment).

In the embodiment, the estimation unit 214 performs the calculation expressed in Equation (2).

$$Tr3=Tr1+Vr2 \times ts = G \qquad (2)$$

In Equation (2), the variable Vr2 indicates the target cylinder speed (instructed speed) at the second point of time t2. The variable ts indicates the cycle. The variable G indicates the gain. In the embodiment, the blade controller 210 uses the estimated height data Tr3 to output the control signal in response to the operation instruction for controlling the blade 40 at the first point of time t1.

An instructed speed Vr2 at the second point of time t2, which is earlier than the first point of time t1 by one cycle (1×10 milliseconds earlier), is used in Equation (2). Instead of the instructed speed Vr2 at the second point of time t2, which is earlier than the first point of time t1 by one cycle, an instructed speed Vr22 at the point of time t22 earlier by two cycles (2×10 milliseconds earlier), an instructed speed Vr23 at the point of time t23 earlier by three cycles (3×10 milliseconds earlier), . . . , an instructed speed Vr2n at the point of time t2n earlier by n cycles (n×10 milliseconds earlier) may be used. That is, the estimation unit 214 may perform the calculation expressed in Equation (3).

$$Tr3=Tr1+(Vr2+Vr22+ \ldots +Vr2n) \times ts \times G \qquad (3)$$

By estimating the estimated height data Tr3 and outputting the operation instruction at the first point of time t1 according to the estimated height data Tr3, the occurrence of an overshoot can be suppressed even when the gain G is increased to improve responsiveness.

In Equation (2) and Equation (3), the gain G can optionally be determined. In the embodiment, the gain G is adjusted according to the blade load data. The blade controller 210 includes the blade load data acquisition unit 218 for acquiring the blade load data representing the load on the blade 40. The estimation unit 214 may be configured to adjust the gain G to calculate the estimated height data Tr3 according to the blade load data. For example, the estimation unit 214 reduces the gain G when the blade load data is high. When the blade load is high, the estimated height data Tr3 may largely deviate from a true value (true height of the blade tip 40P at the first point of time t1). When the blade load is high, the gain G is reduced to prevent significant deviation of the estimated height data Tr3 from the true value.

After estimating the estimated height data Tr3, the blade control unit 219 outputs the operation instruction to reduce the difference between the estimated height data Tm3 and the target height data Tr3 at the first point of time t1 according to the estimated height data Tr3 and the target height data Tm3 (step SP7). The deterioration in the performance of the blade 40 to follow the designed surface can thus be suppressed.

In the embodiment, the blade control unit 219 outputs the operation instruction to reduce the difference between the estimated height data Tm3 and the target height data Tr3 using the sliding mode control. High responsiveness of the blade 40 can thus be achieved. The blade control unit 219 may be configured to output the operation instruction to reduce the difference between the estimated height data Tm3 and the target height data Tr3 using the PID control.

Note that, the estimated height at the future point of time (the third point of time) is estimated from the actual height data at the present point of time (the first point of time) and the operation instruction at the past point of time (the second point of time). The estimated height at a future point of time may be estimated from the actual height data at a past point of time (for example, the second point of time) and the operation instruction at a past point of time earlier than the former past point of time. That is, the estimated height of the blade tip 40P at the third point of time t3, which is later than the first point of time t1, may be estimated according to the operation instruction output from the blade control unit 219 at the second point of time t2, which is earlier than the first point of time t1, and the actual height data representing the actual height of the blade tip 40P at the first point of time t1 or a point of time earlier than the first point of time t1 (for example, the point of time t2, the point of time t22, . . . , the point of time t2n).

In the embodiment, if it is determined in step SP5 that the first difference Δ1 is larger than the second difference Δ2, the first difference Δ1 is equal to the second difference Δ2, or the first difference Δ1 is equal to or larger than the predetermined threshold (YES: in step SP5), the estimation unit 214 performs no estimation of the estimated height and the blade control unit 219 outputs the operation instruction, according to the actual height data Tr1 at the first point of time t1 and the target height data Tm1 at the first point of time t1, to reduce the difference between the actual height data Tr1 and the target height data Tm1 at the first point of time t1 (step SP8).

That is, in the embodiment, when the blade tip 40P makes a motion so as the actual height thereof to gradually deviate from the target height or when the difference between the actual height and the target height is significantly greater than the predetermined threshold, the operation instruction is output without using the estimated height data Tr3 but using the actual height data Tr1 at the first point of time t1.

For example, a process may be made to set the gain G to zero in Equation (2) and in Equation (3), that is, to swap the estimated height data Tr3 for the actual height data Tr1.

When the estimated height data Tr3 is used, the occurrence of an overshoot can be suppressed. However, when the estimated height data Tr3 is used, the output of the operation instruction is likely to be suppressed. When a motion is made so as the actual height to gradually deviate from the target height or when the difference between the actual height and the target height is significantly larger than the predetermined threshold, it may be difficult to rapidly change the actual height to be close to the target height.

Therefore in the embodiment, if it is determined that the first difference Δ1 is larger than the second difference Δ2, the first difference Δ1 is equal to the second difference Δ2, or the first difference Δ1 is equal to or larger than the predetermined threshold, the blade control unit 219 outputs the operation instruction, according to the actual height data Tr1 at the first point of time t1 and the target height data Tm1 at the first point of time t1, to reduce the difference between the actual height data Tr1 and the target height data Tm1 at the first point of time t1. Thus, the actual height can rapidly change to be close to the target height.

Figure 9:
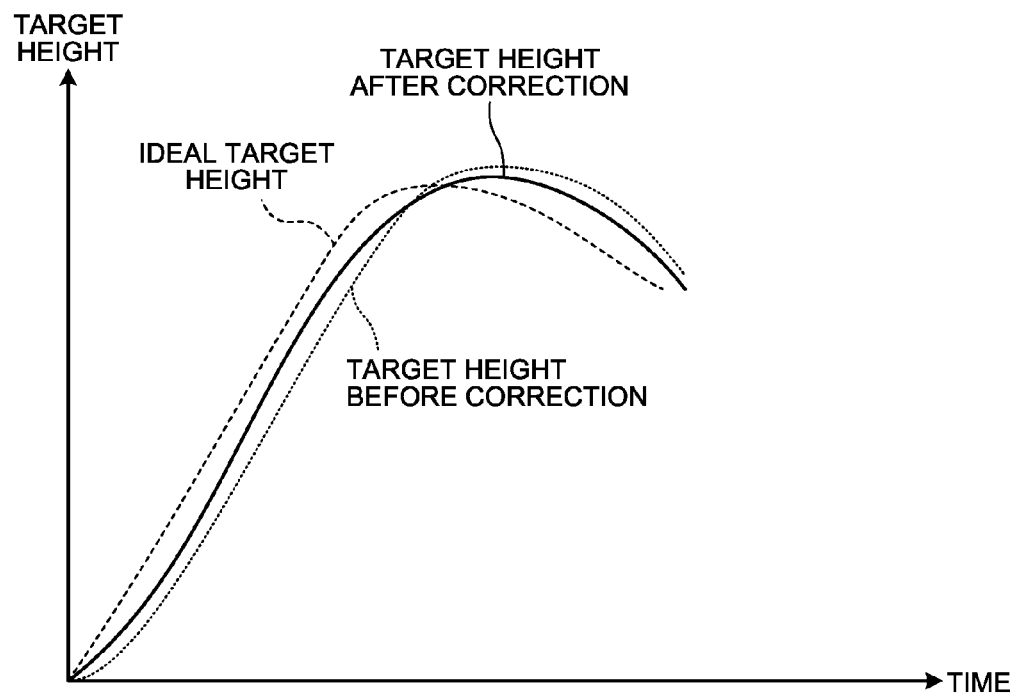
FIG. 9 is a chart explaining an example of the target height according to the embodiment.

FIG. 9 illustrates an effect of the correction of the target height made by the target height correction unit 217. As illustrated in FIG. 9, the corrected target height is close to an ideal target height compared to the target height before correction. The ideal target height is the target height calculated according to the detected actual behavior of the vehicle body 10. By correcting the target height, the blade behaves to be closer to the ideal target height than the target height before correction. In this manner, the delay time between the output of the operation instruction and the start of the actual operation of the blade can be reduced. Thus, troubles such as the blade ascending and descending (undulating) relatively to the target height can be eliminated.

Figure 10:
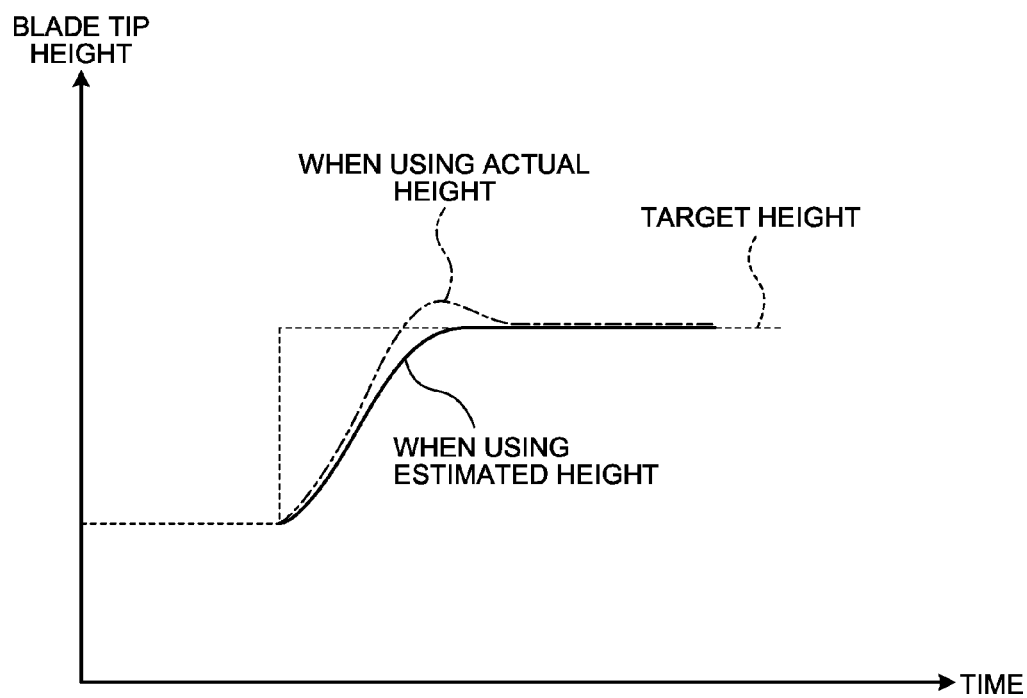
FIG. 10 is a chart explaining an example of the blade tip height according to a comparative example and a blade tip height according to the embodiment.

FIG. 10 illustrates an example of the height of the blade tip 40P where the blade 40 is controlled without using the estimated height but using the actual height and an example of the height of the blade tip 40P where the estimated height is used to control the blade 40. In FIG. 10, the target height changes stepwise while the bulldozer 100 is working the ground using the blade 40, in other words, the traveling apparatus 20 of the bulldozer 100 is traveling with a predetermined load on the blade 40. FIG. 10 illustrates the height of the blade tip 40P, where the actual height is used to control the blade 40, and the height of the blade tip 40P, where the estimated height is used to control the blade 40.

When the blade 40 crosses a step of the designed surface when the traveling apparatus 20 of the bulldozer 100 is traveling, the target height calculated in the target height generating unit 220 changes stepwise as illustrated in FIG. 10.

When the blade 40 is controlled using the actual height as in the comparative example, the blade 40 overshoots as illustrated in FIG. 10. During an operation of working the ground where the load on the blade 40 and the vehicle speed of the traveling apparatus 20 are likely to change, an overshoot may occur and cause unstable control of the blade 40. As a result, the bulldozer 100 may not be able to work the ground to form the desired profile.

In the embodiment, the blade 40 is controlled using the estimated height and thereby the overshoot of the blade 40 is suppressed as illustrated in FIG. 10. The blade 40 is adjusted to be at the target height without causing an overshoot. In this manner, the bulldozer 100 can work the ground to form the desired profile.

Effects

As described above, according to the embodiment, the estimated height data Tr3 representing the estimated height of the blade tip 40P at the third point of time t3, which is later than the first point of time t1, is estimated according to the operation instruction output from the blade control unit 219 at the second point of time t2, which is earlier than the first point of time t1, and the actual height data Tr1 representing the actual height of the blade tip 40P at the first point of time t1. The operation instruction is output according to the estimated height data Tr3 and the target height data Tm1. In this manner, even when a dead time exists in the hydraulic system, the responsiveness of the blade 40 can be improved by increasing the gain while suppressing the occurrence of an overshoot.

For example, if a dead time effecting the control signal exists in the hydraulic system, it may be difficult to make the blade tip 40P of the blade 40 follow the designed surface. If the gain is increased to improve the responsiveness, the dead time causes an overshoot, which may make the blade tip of the blade difficult to follow the designed surface.

In the embodiment, the occurrence of an overshoot can be suppressed even under a large gain. Accordingly, the blade tip of the blade 40 can precisely follow the designed surface with high responsiveness. The bulldozer 100 can therefore work the ground to form the desired profile.

In the embodiment the blade control unit 219 controls the blade 40 with the sliding mode control which is a modern control theory. The sliding mode control may provide higher responsiveness than the PID control. As for the control system employing the sliding mode control to improve responsiveness, the dead time in the hydraulic system may cause an overshoot in certain loads and traveling conditions. According to the embodiment, the blade 40 is controlled using the estimated height data Tr3 to suppress an occurrence of an overshoot or the like, thereby improving controllability.

Further, in the embodiment, the target height calculation unit 223 calculates the target height and the actual height calculation unit 212 calculates the actual height for a predetermined cycle ts. The first point of time t1, the second point of time t2, and the third point of time t3 are determined according to the cycle ts. Therefore, the ground can be worked to form the desired profile using the blade 40.

In the embodiment, the gain G used for calculating the estimated height data Tr3 is adjusted according to the blade load data. This suppresses a large deviation of the estimated height data Tr3 from the true value caused by the change in the blade load, thereby suppressing deterioration in accuracy of the estimated height data Tr3.

According to the embodiment, if it is determined that the first difference $\Delta 1$ is larger than the second difference $\Delta 2$, the first difference $\Delta 1$ is equal to the second difference $\Delta 2$, or the first difference $\Delta 1$ is equal to or larger than the predetermined threshold, the operation instruction is output without using the estimated height data Tr3 but using the actual height data Tr1 at the first point of time t1. Thus, when the actual height deviates from the target height, the actual height can rapidly changes to be close to the target height.

Further in the embodiment, the target height data Tm3 at the third point of time t3 is estimated according to the target height data Tm1 at the first point of time t1 and the target height data Tm2 at the second point of time t2. The blade 40 is controlled so as the target height data Tm3 and the estimated height data Tr3 to be close to each other. Thus, when the process in the target height generating unit 220 (including calculation and output) has a delay, the blade 40 is controlled to cancel the delay. Therefore, even when the blade is controlled according to the actual height, the method can be applied and the bulldozer 100 can therefore work the ground to form the desired profile.

In the aforementioned embodiment, the work vehicle 100, which is exemplarily the bulldozer 100, is described. The work vehicle 100 may be a motor grader including the blade mechanism.

REFERENCE SIGNS LIST 10 vehicle body
11 driver's room
12 engine room
20 traveling apparatus
21 crawler
30 lift frame
31 ball joint
32 pitch support link
33 supporting part
40 blade
40P blade tip
41 universal joint
42 pitching joint 50 lift cylinder
50S lift cylinder sensor
60 angle cylinder
70 tilt cylinder
80 GPS receiver
90 IMU
95 sprocket
100 bulldozer (work vehicle)
200 blade control apparatus
210 blade controller
211 vehicle data acquisition unit
212 actual height calculation unit
213 determination unit
214 estimation unit
215 filtering unit
216 target height data acquisition unit
217 target height correction unit
218 blade load data acquisition unit
219 blade control unit
220 target height generating unit
221 designed surface data storing unit
222 data acquisition unit
223 target height calculation unit
230 proportional control valve
240 hydraulic pump
241 hydraulic motor
245 hydraulic pump
250 hydraulic sensor
260 input unit
300 memory unit
L lift cylinder length (stroke distance of lift cylinder)
θ lift angle

The invention claimed is:

1. A blade control apparatus configured to control a height of a blade tip of a blade supported on a vehicle body of a work vehicle so as to move in an up-and-down direction, the apparatus comprising:
a proportional control valve configured to control working fluid to be supplied to a hydraulic cylinder that can move the blade in up-and-down direction;
a blade control unit configured to output a control signal to the proportional control valve based on an operation instruction including a target cylinder speed instruction of the hydraulic cylinder;
a target height generating unit configured to calculate a target height of the blade tip based on absolute position data representing an absolute position of the vehicle body, vehicle body inclination angle data representing an inclination angle of the vehicle body, and designed surface data representing a designed surface that is a three dimensionally designed ground profile forming a target profile of a ground to be excavated;
a target height data acquisition unit configured to acquire target height data representing the target height of the blade tip at a first point of time calculated in the target height generating unit;
an actual height calculation unit configured to calculate an actual height of the blade tip at the first point of time based on the absolute position data at the first point of time, the vehicle body inclination angle data at the first point of time, and cylinder length data representing a stroke distance of the hydraulic cylinder at the first point of time;
a determination unit configured to determine whether a first difference between the target height and the actual height at the first point of time is larger than a second difference between the target height and the actual height at a second point of time which is earlier than the first point of time; and
an estimation unit configured to estimate an estimated height of the blade tip at a third point of time which is later than the first point of time, based on the operation instruction output from the blade control unit at the second point of time, and actual height data representing an actual height of the blade tip at the first point of time or at a point of time earlier than the first point of time, wherein
the estimated height of the blade tip at the third point of time estimated by the estimation unit is determined as the actual height of the blade tip at the first point of time when the first difference is smaller than the second difference, and
the blade control unit outputs the control signal to the proportional control valve to reduce a difference between the actual height of the blade tip at the first point of time determined to be the estimated height of the blade tip at the third point of time and the target height of the blade tip at the first point of time when the first difference is smaller than the second difference.

2. The blade control apparatus according to claim 1, wherein
the actual height calculation unit calculates the actual height for a predetermined time period,
the second point of time includes a point of time earlier than the first point of time by one multiple of the predetermined time period, and
the third point of time includes a point of time later than the first point of time by one multiple of the predetermined time period.

3. The blade control apparatus according to claim 2, wherein
the estimation unit estimates the estimated height of the blade tip at the third point of time based on an actual height at the first point of time or a point of time earlier than the first point of time, an operation instruction at the second point of time, and the predetermined time period.

4. The blade control apparatus according to claim 3, further comprising
a blade load data acquisition unit configured to acquire blade load data representing a load on the blade, wherein
the estimation unit adjusts a gain to calculate the estimated height of the blade tip at the third point of time based on the blade load data.

5. The blade control apparatus according to claim 1, wherein
the blade control unit outputs the control signal to the proportional control valve at the first point of time to reduce a difference between the actual height of the blade tip at the first point of time determined to be the established height of the blade tip at the third point of time and the target height of the blade tip at the first point of time determined to be the target height of the blade tip at the third point of time when the first difference is determined to be smaller than the second difference, and
the blade control unit outputs the control signal to the proportional control valve at the first point of time to reduce a difference between the actual height of the blade tip at the first point of time calculated by the actual height calculation unit without performing the estimation of the estimated height by the estimation unit and the target height of the blade tip at the first point of time which is calculated by the target height generating unit and is acquired by the target height data acquisition unit, when the first difference is determined to be larger than the second difference.

6. The blade control apparatus according to claim 1, further comprising
a target height correction unit configured to estimate the target height of the blade tip at the third point of time based on the target height of the blade tip at the first point of time which the target height data acquisition unit acquires from the target height generating unit at the first point of time and the target height which the target height data acquisition unit acquires from the target height generating unit, wherein
the target height of the blade tip at the third point of time estimated in the target height correction unit is determined as the target height of the blade tip at the first point of time.

7. A work vehicle comprising:
a vehicle body;
a blade including a blade tip supported on the vehicle body so as to move in an up-and-down direction; and
the blade control apparatus according to claim 1.

8. A method of controlling a blade by controlling a height of a blade tip of a blade supported on a vehicle body of a work vehicle so as to move in an up-and-down direction, the method comprising:
outputting, from a blade control unit, a control signal to a proportional control valve configured to control working fluid to be supplied to a hydraulic cylinder that can move the blade in an up-and-down direction based on an operation instruction including a target cylinder speed instruction of the hydraulic cylinder;
calculating, by a target height generating unit, a target height of the blade tip based on absolute position data representing an absolute position of the vehicle body, vehicle body inclination angle data representing an inclination angle of the vehicle body, and designed surface data representing a designed surface that is a three dimensionally designed ground profile forming a target profile of a ground to be excavated;
acquiring, by a target height data acquisition unit, a target height data representing the target height of the blade tip at a first point of time and at a second point of time which is earlier than the first point of time calculated by a target height generating unit;
calculating, by an actual height calculation unit, an actual height of the blade tip at the first point of time based on the absolute position data at the first point of time, the vehicle body inclination angle data at the first point of time, and cylinder length data representing a stroke distance of the hydraulic cylinder at the first point of time;
determining, by a determination unit, whether a first difference between the target height of the blade tip at the first point of time and the actual height of the blade tip at the first point of time is larger than a second difference between the target height of the blade tip at the second point of time and the actual height of the blade tip at the second point of time; and
estimating, by estimation unit, an estimated height of the blade tip at a third point of time, which is later than the first point of time, based on the operation instruction output at the second point of time, and an actual height data representing an actual height of the blade tip at the first point of time or at a point of time earlier than the first point of time when the first difference is smaller than the second difference, wherein
the control signal is output from the blade control unit to the proportional control valve to reduce a difference between the actual height of the blade tip at the first point of time determined according to the estimated height of the blade tip at the third point of time and the target height of the blade tip at the first point of time when the first difference is smaller than the second difference.

* * * * *